United States Patent
Chiu et al.

(10) Patent No.: US 7,327,589 B2
(45) Date of Patent: Feb. 5, 2008

(54) FULL-BRIDGE CIRCUIT

(75) Inventors: Magellan Chiu, Taoyuan Hsien (TW); Chun-Lung Chiu, Taoyuan Hsien (TW); Wei-Shuo Tseng, Taoyuan Hsien (TW); Ming-Shi Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 288 days.

(21) Appl. No.: 11/146,035

(22) Filed: Jun. 7, 2005

(65) Prior Publication Data

US 2005/0270815 A1   Dec. 8, 2005

(30) Foreign Application Priority Data

Jun. 8, 2004   (TW)   ................................ 93116397 A

(51) Int. Cl.
*H02M 7/5387* (2006.01)
*H02M 3/24* (2006.01)
*H02P 5/34* (2006.01)

(52) U.S. Cl. ........................................ 363/132; 363/98
(58) Field of Classification Search ................... 363/16, 363/17, 56.01, 56.02, 97, 98, 131, 132; 318/264–268, 318/272, 800, 801, 805
See application file for complete search history.

(56) References Cited

U.S. PATENT DOCUMENTS

| | | | |
|---|---|---|---|
| 4,379,984 A * | 4/1983 | Muller | 318/254 |
| 5,594,635 A * | 1/1997 | Gegner | 363/124 |
| 6,628,275 B2 * | 9/2003 | Vossen et al. | 345/211 |
| 6,757,184 B2 * | 6/2004 | Wei et al. | 363/71 |
| 6,989,643 B2 * | 1/2006 | Komaromi et al. | 318/293 |
| 7,015,679 B2 * | 3/2006 | Ryba et al. | 323/271 |

* cited by examiner

*Primary Examiner*—Matthew V. Nguyen
(74) *Attorney, Agent, or Firm*—Birch, Stewart, Kolasch & Birch, LLP

(57) ABSTRACT

A full-bridge circuit for a heat dissipation system. The heat dissipation system further includes a fan and a control circuit. The control circuit outputs a first control signal and a second control signal. The full-bridge circuit includes a first control line having a first switch and a third switch serially coupled, a second control line includes a second switch and a fourth switch serially coupled, and a induction coil having one terminal coupled between the first and third switches and the other terminal coupled between the second and fourth switches. The ON/OFF states of the first and second switches are controlled by the first and second control signals respectively. The ON/OFF states of the third and fourth switches are controlled by two driving voltage sources respectively.

20 Claims, 2 Drawing Sheets

US 7,327,589 B2

FULL-BRIDGE CIRCUIT

BACKGROUND OF THE INVENTION

1. Field of the Invention

The invention relates to a full-bridge circuit, and in particular to a full-bridge circuit employed in a direct-current fan.

2. Brief Discussion of the Related Art

FIG. 1a is a block diagram of a conventional heat dissipation system. FIG. 1b shows a circuit of the full-bridge circuit in FIG. 1a. As shown in FIG. 1a, the heat dissipation system comprises a fan 10, a control circuit 11, and a full-bridge circuit 12. The full-bridge circuit 12 comprises switches $Q_1$ to $Q_4$ and an induction coil L. When the switches $Q_1$ and $Q_4$ are turned on, the switches $Q_2$ and $Q_3$ are turned off and a current path of an input voltage $V_{in}$ includes the switch $Q_1$, the induction coil L, and the switch $Q_4$. Conversely, when the switches $Q_1$ and $Q_4$ are turned off, the switches $Q_2$ and $Q_3$ are turned on and a current path of the input voltage $V_{in}$ includes the switch $Q_2$, an induction coil L, and the switch $Q_3$.

The switches $Q_1$ to $Q_4$ of the full-bridge circuit 12 are respectively controlled by four control signals output from node $A_1$ to $A_4$ of the control circuit 11. The control signals from the nodes $A_1$ and $A_4$ are in phase and out of phase with the control signals from the nodes $A_2$ and $A_3$. To ensure that the switch $Q_3$ is turned off when the switch $Q_1$ is turned on, a high-level control signal from the node $A_1$ turns on the switch $Q_1$ and a switch $S_1$. Thus residual current of the switch $Q_3$ is grounded, preventing false operation of the switch $Q_3$. Similarly, a high-level control signal from the node $A_2$ turns on the switch $Q_2$ and a switch $S_2$. Thus, that residual current of the switch $Q_4$ is grounded, preventing false operation of the switch $Q_4$.

The control circuit 11 is typically a micro-processor control unit (MCU) for outputting the four control signals $A_1$ to $A_4$. As the largest output voltage of a MCU is 5V, the lower bridge, the switches $Q_3$ and $Q_4$, of the full-bridge circuit 12 must substantially composed of low voltage elements, such as 4.5V metal oxide semiconductor field effect transistors (MOSFETs). The low voltage elements however have weak anti-noise ability resulting in false operation due to floating voltage in the circuit. As the number of available low voltage elements is limited, effective cost reduction is difficult. Moreover, four control signals are required from a MCU to control switches $Q_1$ to $Q_4$ of the full-bridge circuit 12, resulting in complicated circuitry.

Thus, a full-bridge circuit employed by a heat dissipation system for improving anti-noise ability and simplification of the full-bridge circuit are desirable.

SUMMARY OF THE INVENTION

Full-bridge circuits are provided. Some embodiments of the full-bridge circuit comprise two control signals utilized for controlling all switches therein to simplify the circuitry. The switches can comprises various types of elements, including low cast elements reducing in circuit cost.

Some embodiments of a full-bridge circuit are employed in heat dissipation systems. Some embodiments of a heat dissipation system comprise a control circuit outputting a first control signal and a second control signal to the full-bridge circuit. The first and second control signals are out of phase.

The full-bridge circuit comprises a first control line, a second control line, and an induction coil. The first control line comprises a first switch and a third switch serially connected. The second control line, parallel with the first control line, comprises a second switch and a fourth switch serially connected. The induction coil has one terminal coupled between the first and third switches and the other terminal coupled between the second and fourth switches. The ON/OFF states of the first and second switches are controlled by the first and second control signals respectively and the third and fourth switches are high voltage switches.

An input terminal of the third switch is coupled to a fifth switch in parallel and to a first resistor and a first driving voltage source in series. The ON/OFF state of the fifth switch is controlled by the first control signal. The ON/OFF state of the third switch is controlled by the first driving voltage source according to the ON/OFF state of the fifth switch.

An input terminal of the fourth switch is coupled to a sixth switch in parallel and to a second resistor and a second driving voltage source in series. The ON/OFF state of the sixth switch is controlled by the second control signal. The ON/OFF state of the fourth switch is controlled by the second driving voltage source according to the ON/OFF state of the sixth switch.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of tile present invention, and wherein.

DETAILED DESCRIPTION OF THE PREFERRED EMBODIMENTS

Figure 1A:
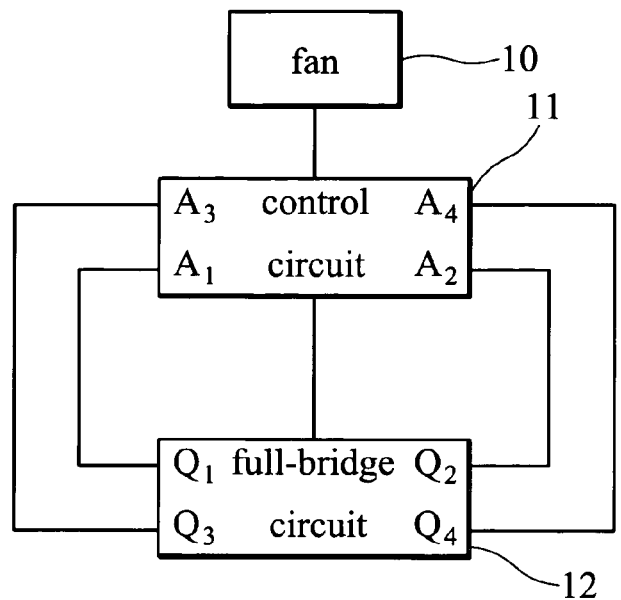
FIG. 1a is a block diagram of a conventional heat dissipation system.
Figure 1B:
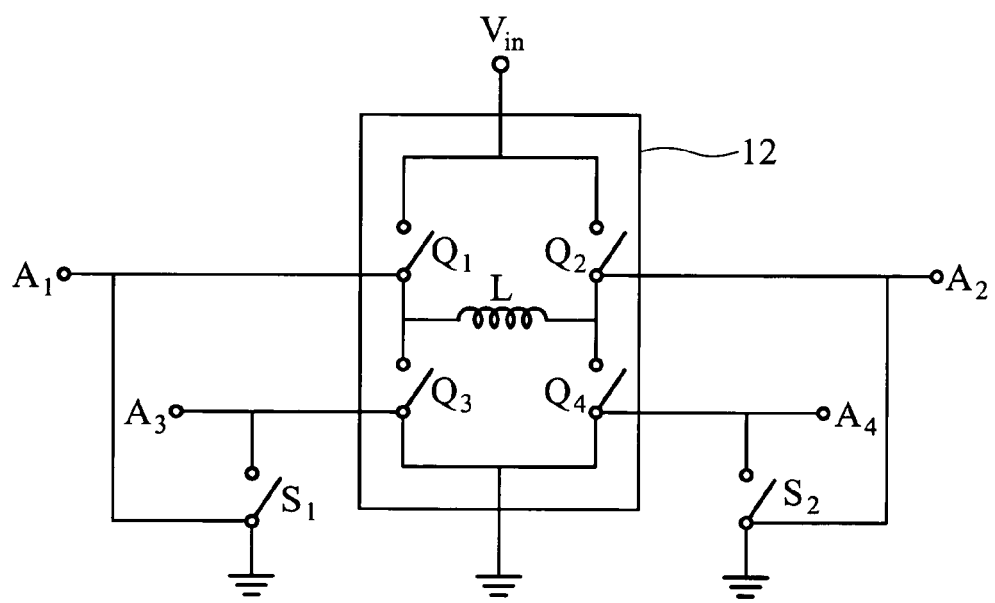
FIG. 1b shows a circuit of a conventional full-bridge circuit.

Full-bridge circuits for heat dissipation system are provided. An embodiment of a full-bridge circuit comprises a fan and a control circuit. The fan dissipates heat for an object. The control circuit outputs control signals to control ON/OFF states of switches within the full-bridge circuit. For example, a micro-processor control unit (MCU) outputs control signals. In other words, blocks of some embodiments of the heat dissipation system are as shown in FIG. 1a.

Figure 2:
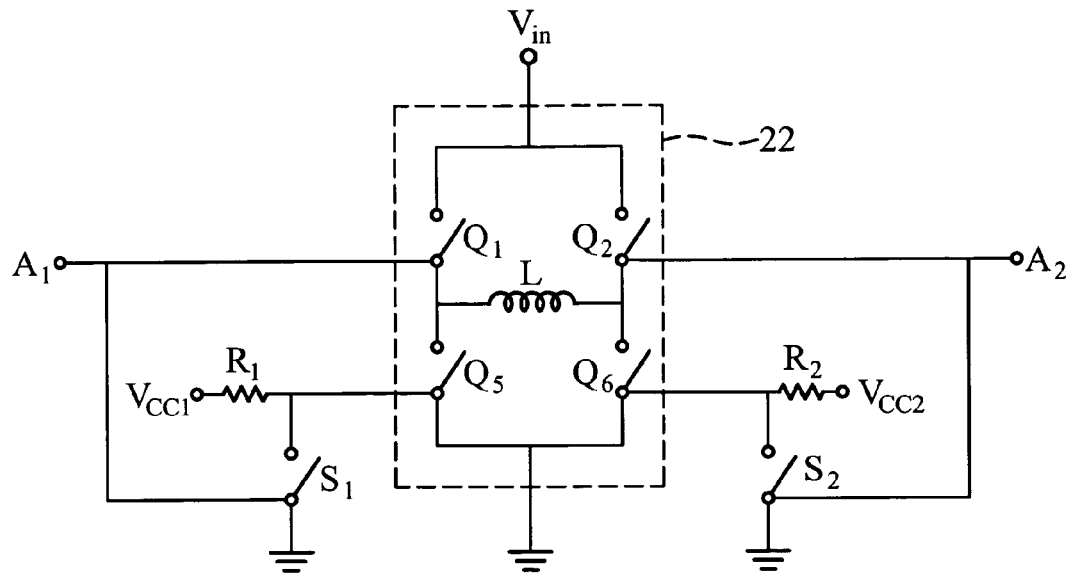
FIG. 2 shows an embodiment of a full-bridge circuit according to the invention.

Referring to FIG. 2, like reference numbers are used to designate like parts throughout the various views and illustrative embodiments. An embodiment of a full-bridge circuit 22 receives two control signals to control ON/OFF states of switches therein. The two control signals are a first control signal from a node $A_1$ and a second control signal from a node $A_2$. The first and second control signals are out of phase.

As shown in FIG. 2, the full-bridge circuit 22 comprises a first control line, a second control line, and an induction coil L. The first control line is comprises a first switch $Q_1$ and a third switch $Q_5$ and the second control line parallel to the first control line comprises a second switch $Q_2$ and a fourth switch $Q_6$. One terminal of the induction coil L is coupled between the first and third switches $Q_1$ and $Q_5$, and the other terminal is coupled between the second and fourth switches $Q_2$ and $Q_6$.

The ON/OFF state of the first switch $Q_1$ is controlled by the first control signal from the node $A_1$ and that of the second switch $Q_2$ is controlled by the second control signal from the node $A_2$. The third and fourth switches $Q_5$ and $Q_6$ are controlled by first and second driving voltage sources $V_{cc1}$ and $V_{cc2}$ respectively. The third and fourth switches $Q_5$ and $Q_6$ are not controlled by control signals from an MCU, and they can be high voltage elements, such as standard level MOSFETs. The first and second switches $Q_1$ and $Q_2$ are controlled by control signals from an MCU, and logical level MOSFETs can be chosen to serve as the first and second switches $Q_1$ and $Q_2$.

In order to control the ON/OFF state of the third switch $Q_5$, an input terminal of the third switch $Q_5$ is coupled to a fifth switch $S_1$ in parallel and to a first resistor $R_1$ and the first driving voltage source $V_{cc1}$ in series. The ON/OFF state of the fifth switch $S_1$ is controlled by the first control signal from the node $A_1$. According the ON/OFF state of the fifth switch $S_1$, the first driving voltage source $V_{cc1}$ is directly connected to ground or turns on the third switch $Q_5$. For example, the first driving voltage source $V_{cc1}$ and the third switch $Q_5$ are connected to ground when the fifth switch $S_1$ is turned on, and the third switch $Q_5$ is turned on by the first driving voltage source $V_{cc1}$ when the fifth switch $S_1$ is turned off. Additionally, an input terminal of the fourth switch $Q_6$ is coupled to a sixth switch $S_2$ in parallel and to a second resistor $R_2$ and the second driving voltage source $V_{cc2}$ in series. The ON/OFF state of the sixth switch $S_2$ is controlled by the second control signal from the node $A_2$. According the ON/OFF state of the sixth switch $S_2$, the second driving voltage source $V_{cc2}$ is directly connected to the ground or is used to turn on the fourth switch $Q_6$.

Figure 3:
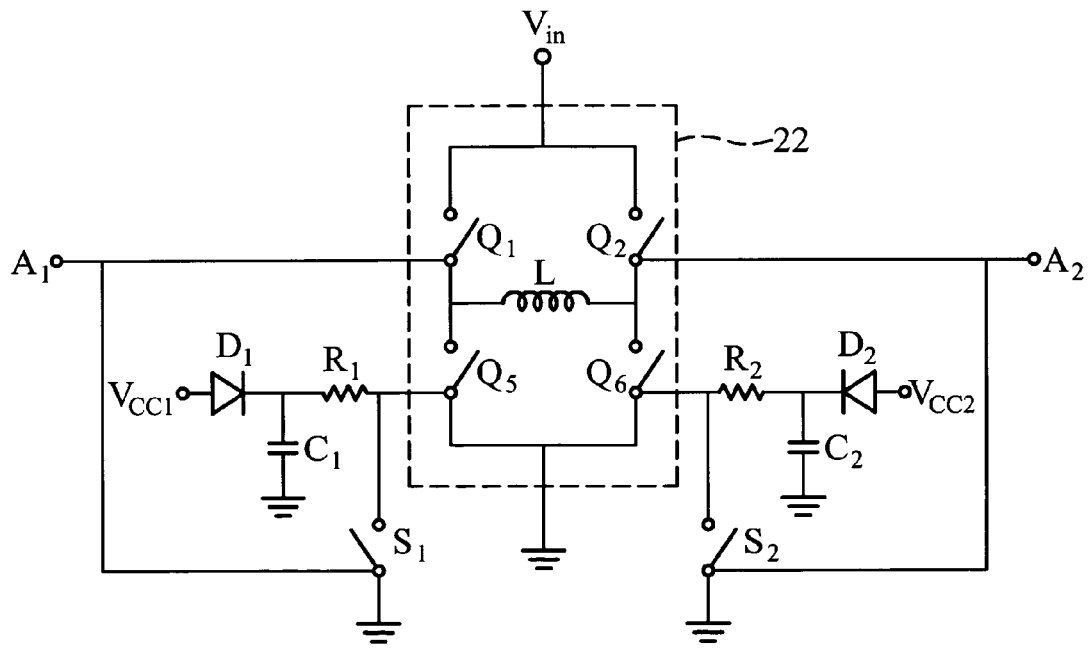
FIG. 3 shows an embodiment of an other full-bridge circuit according to the invention.

FIG. 3 is an embodiment of an other full-bridge circuit. An embodiment of a full-bridge circuit shown in FIG. 3 is same as those previously shown with the exception of the operation and connection of the third and fourth switches $Q_5$ and $Q_6$. For the third switches $Q_5$, the first driving voltage source $V_{cc1}$ is coupled to a first diode $D_1$ and a first capacitor $C_1$. The first diode $D_1$ has an anode coupled to die first driving voltage source $V_{cc1}$ and a cathode coupled to a first resistor $R_1$. The first capacitor $C_1$ has one terminal coupled between the first diode $D_1$ and the first resistor $R_1$ and the other terminal coupled to ground. For the fourth switches $Q_6$, the second driving voltage source $V_{cc2}$ is coupled to a second diode $D_2$ and a second capacitor $C_2$. The second diode $D_2$ has an anode coupled to the second driving voltage source $V_{cc2}$ and a cathode coupled to a second resistor $R_2$. The second capacitor $C_2$ has one terminal coupled between the second diode $D_2$ and the second resistor $R_2$ and The other terminal coupled to the ground.

As the third and fourth switches $Q_5$ and $Q_6$ of the lower bridge are controlled by the first and second driving voltage sources $V_{cc1}$ and $V_{cc2}$ respectively, and not by control signals from an MCU, in some embodiments of the full-bridge circuit, standard level MOSFETs, high voltage elements, and the like can be used. For example, the third and fourth switches $Q_5$, and $Q_6$ can be switch elements driven by 5V to 12V, which provides higher anti-noise ability than elements driven by 4.5V. Thus, false operation caused by floating voltage in the circuit may be more readily prevented.

Moreover, there are various low cost elements, such as logical level MOSFETs and standard level MOSFETs, can be used as lower bridge switches.

In some embodiments of a full-bridge circuit of the invention, two switches of one control line are controlled by one control signal and two switches of the other control line are controlled by the other control signal. In other words, four switches are controlled by only two control signals, simplifying the circuitry.

As the third and fourth switches $Q_5$ and $Q_6$ of the lower bridge are high voltage elements and the fifth and sixth switches $S_1$ and $S_2$ are low voltage elements, turn on time for the third and fourth switches $Q_5$ and $Q_6$ is lengthy and a short time is required to ground the third and fourth switches $Q_5$ and $Q_6$. Thus, shorts cannot occur between the lower bridge and upper bridge of the circuit because the switches of the lower bridge are turned on slowly and turned off rapidly. The coupling of the first and second capacitors $C_1$ and $C_2$ and the third and fourth switches $Q_5$ and $Q_6$ allows the transistors to remain on for a short time when the voltage sources stops supplying voltage. Thus the fan is braked and stops rotating.

Finally, while the invention has been described by way of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A full-bridge circuit for a heat dissipation system having a control circuit which outputs a first control signal and a second control signal to the full-bridge circuit, the full-bridge circuit comprising:

a first control line having a first switch and a third switch serially connected;

a second control line parallel with the first control line, having a second switch and a fourth switch serially connected; and an induction coil having one terminal coupled between the first and third switches and the other terminal coupled between the second and fourth switches, wherein the ON/OFF states of the first and second switches are controlled by the first and second control signals respectively;

wherein an input terminal of the third switch is coupled to a fifth switch in parallel and to a first resistor and a first driving voltage source in series, the ON/OFF state of the fifth switch is controlled by the first control signal, and the ON/OFF state of the third switch is controlled by the first driving voltage source and the first resistor according to the ON/OFF state of the fifth switch; and wherein an input terminal of the fourth switch is coupled to a six switch in parallel and to a second resistor and a second driving voltage source in series, the ON/OFF state of the sixth switch is controlled by the second control signal, and the ON/OFF state of the fourth switch is controlled by the second driving voltage source and the second resistor according to the ON/OFF state of the sixth switch.

2. The full-bridge circuit as claimed in claim 1, wherein the first and second control signals are out of phase.

3. The full-bridge circuit as claimed in claim 1, wherein the third and fourth switches are high voltage switches.

4. The full-bridge circuit as claimed in claim 1, wherein the control circuit is coupled to a fan.

5. The full-bridge circuit as claimed in claim 1, wherein the control circuit is a micro-processor control unit.

6. The full-bridge circuit as claimed in claim 1, wherein the third switch is a standard level metal oxide semiconductor field effect transistor.

7. The full-bridge circuit as claimed in claim 1, wherein the fourth switch is a standard level metal oxide semiconductor field effect transistor.

8. The full-bridge circuit as claimed in claim 1, wherein the first switch is a logical level metal oxide semiconductor field effect transistor.

9. The full-bridge circuit as claimed in claim 1, wherein the second switch is a logical level metal oxide semiconductor field effect transistor.

10. The full-bridge circuit as claimed in claim 6, wherein voltage from the first driving voltage source is between 5 V to 12 V.

11. The full-bridge circuit as claimed in claim 7, wherein voltage from the second driving voltage source is between 5 V to 12 V.

12. The full-bridge circuit as claimed in claim 4, further comprising:
   a first diode having an anode coupled to the first driving voltage source and a cathode coupled to the first resistor; and
   a first capacitor having one terminal coupled between the first diode and the first resistor and the other terminal coupled to a ground thereby stopping rapid rotation when the first driving voltage source does not supply voltage.

13. The full-bridge circuit as claimed in claim 12, further comprising:
   a second diode having an anode coupled to the second driving voltage source and a cathode coupled to the second resistor; and
   a second capacitor having one terminal coupled between the second diode and the second resistor and the other terminal coupled to a ground thereby stopping rapid rotation when the first driving voltage source does not supply voltage.

14. A fill-bridge circuit for a heat dissipation system having a control circuit which outputs a first control signal and a second control signal to the full-bridge circuit, the full-bridge circuit comprising:
   a first control line having a first switch and a third switch serially connected;
   a second control line parallel with the first control line, having a second switch and a fourth switch serially connected, wherein the ON/OFF states of the first and second switches are controlled by the first and second control signals respectively;
   an induction coil having one terminal coupled between the first and third switches and the other terminal coupled between the second and fourth switches;
   a first diode having an anode coupled to a first driving voltage source and a cathode coupled to a first resistor; and
   a first capacitor having one terminal coupled between the first diode and the first resistor and the other terminal coupled to a ground thereby stopping rapid rotation when the first driving voltage source does not supply voltage;
   wherein an input terminal of the third switch is coupled to a fifth switch in parallel, the ON/OFF state of the fifth switch is controlled by the first control signal, and the ON/OFF state of the third switch is controlled by the first driving voltage source according to the ON/OFF state of the fifth switch; and
   wherein an input terminal of the fourth switch is coupled to a six switch in parallel, the ON/OFF state of the sixth switch is controlled by the second control signal, and the ON/OFF state of the fourth switch is controlled by the second driving voltage source according to the ON/OFF state of the sixth switch.

15. The full-bridge circuit as claimed in claim 14, wherein the control circuit is coupled to a fan.

16. The full-bridge circuit as claimed in claim 14, wherein the control circuit is a micro-processor control unit.

17. The full-bridge circuit as claimed in claim 14, wherein the third and fourth switches are standard level metal oxide semiconductor field effect transistors.

18. The full-bridge circuit as claimed in claim 14, wherein the first and second switches are logical level metal oxide semiconductor field effect transistors.

19. The full-bridge circuit as claimed in claim 14, wherein voltage from the first driving voltage source is between 5 V to 12 V, and voltage from the second driving voltage source is between 5 V to 12 V.

20. The full-bridge circuit as claimed in claim 14, further comprising:
   a second diode having an anode coupled to the second driving voltage source and a cathode coupled to the second resistor; and
   a second capacitor having one terminal coupled between the second diode and the second resistor and the other terminal coupled to a ground thereby stopping rapid rotation when the first driving voltage source does not supply voltage.

* * * * *